United States Patent

[11] 3,567,855

[72] Inventor Hansjoachim Hamisch
Berlin, Germany

[21] Appl. No. 803,858
[22] Filed Mar. 3, 1969
[45] Patented Mar. 2, 1971
[73] Assignee Robert Bosch GmbH
Stuttgart, Germany
[32] Priority Mar. 1, 1968
[33] Germany
[31] P 16 13 990.5

[54] SCANNING APPARATUS WITH AUTOMATIC BEAM CENTERING
14 Claims, 5 Drawing Figs.

[52] U.S. Cl. .......... 178/7.1, 250/202, 179/100.3
[51] Int. Cl. .......... H04n 5/82, G05b 1/06, G11b 7/00
[50] Field of Search .......... 178/7.6, 6.7 (A), 6.7, 6.6, 6.6 (TPR), 7.3 (E), 7.2 (D), 7.1; 250/219, 217, 220, 234, 202, 205, (Inquired); 179/100.2(+)

[56] References Cited

UNITED STATES PATENTS 3,117,183 1/1964 Mullin .......... 178/7.2

*Primary Examiner*—Richard Murray
*Assistant Examiner*—John C. Martin
*Attorney*—Michael S. Striker

ABSTRACT: An elongated focal light spot whose intensity gradually varies along its length, crosses a track of a record carrier having light permeable recordings and scans the same. When the record carrier is undesirably displaced, signals whose intensity varies pass through the light permeable recordings and are received by a photocell which produces varying output signals controlling regulating means by which the focal light spot is again centered on the track.

INVENTOR
HANS JOACHIM HAMISCH

ATTORNEY

INVENTOR
HANS JOACHIM HAMISCH
ATTORNEY

SCANNING APPARATUS WITH AUTOMATIC BEAM CENTERING

BACKGROUND OF THE INVENTION

The present invention relates to an arrangement in which an information pattern in the form of light permeable recordings is sensed by a focal light spot whose light passes the light permeable recordings and is received by a photocell which transforms the light into an electric signal which may be used to produce a television picture, for example. The relative movement between the focal light spot and the record carrier can be a scanning movement in which the light spot is moved transverse to the direction of movement of a band-shaped record carrier, or the band-shaped record carrier is moved in its longitudinal direction, and has one or several longitudinally extending tracks.

In scanning and reproducing arrangements of this type according to the prior art, the quality of the reproduction of the signal depends on the exactness of the movement of the scanning light spot on the track. The reproduction of the scanned signals may be influenced by irregular or inaccurate recording of the tracks, aging of the material of the record carrier, mechanical and electrical tolerances of the transporting means of the record carrier, temperature changes, and the like.

Information is frequently recorded by burning light permeable recordings into an opaque coating provided on a transparent tape. The recordings may be burned by a laser beam or electron beam, and have a track width of less than 2 microns for tracks spaced less than 10 microns. A high density of the information representing recordings has considerable advantage as far as the storing of information on a band-shaped record carrier is concerned, since a record carrier band of limited length can be used for recording a very high amount of information. This advantage can only be utilized, if the recordings of the narrow tracks are read out with the same high accuracy as they were recorded. For example, if the scanning light spot is not symmetrical to the track, or misses the recordings of the track occasionally, or is undesirably located between tracks due to a displacement or change of the record carrier, the electric signals produced by the photocell under the control of the scanning light spot would not truly represent the scanned and readout information.

The prior art provides a method for scanning and reading out television pictures recorded in the form of tracks by providing a special thin recorded line at the beginning of each track, and the scanning light spot is caused to move perpendicularly to the direction of the track when reaching the beginning of the same whereby an alternating current signal is produced. This alternating current signal is compared with an alternating voltage of constant phase, and a phase difference is represented by an error indicating signal which is used for correcting the position of the scanning light spot on the respective track.

This method has the disadvantage that the time during which the recorded test line is scanned, is extremely short so that very high frequency alternating currents have to be used for the comparison of the phases, which causes difficulties regarding the stabilizing of the phases. Furthermore, even if the scanning light spot is accurately centered at the beginning of a track, this does not assure that the correct position of the light spot is maintained during further scanning of the entire track, since the direction or position of the track may vary, due to outside influences, from the scanning direction of the scanning light spot.

SUMMARY OF THE INVENTION

It is one object of the invention to provide a scanning apparatus in which the position of a scanning light spot in relation to a track is continuously controlled during scanning of the entire track.

Another object of the invention is to provide a simple and inexpensive apparatus which continuously regulates the position of a scanning light spot in relation to the scanned track.

Another object of the invention is to regulate the position of a scanning light spot on a track in such a manner that the light spot is again centered on the track when a relative displacement between the track and the light spot takes place.

With these objects in view, the present invention relates to a regulated scanning apparatus, particularly for reading out tracks whose recordings represent a television picture. The recordings are light permeable, and are sensed by a scanning light spot whose light passes through the light permeable recordings and is received by a photocell which produces electrical signals in accordance with the amount of light passing through the recordings of the track.

In accordance with the invention, the scanning light spot is lengthened in a direction transverse to the track, so that the end portions of the light spot project from the track and are located in areas between the tracks.

The light spot has a substantially constant intensity gradient along its transverse length, which is advantageously produced by a grey wedge which partly attenuates the beam of light before the same is focused to form the scanning light spot. The electric signals produced by the photocell receiving light through the recordings, vary in accordance with the position of the scanning light spot on the track due to the fact that the light intensities are different along the length of the light spot.

A mean value of the output signal of the photocell is formed during a time period which is long as compared with the time required for sensing one recording, and a regulating signal is formed of the mean value of the varying signals, and is used for deflecting the beam of light in such a manner that the scanning light spot is centered on the track upon each transverse deviation.

Due to the fact that the elongated scanning light spot is always returned to a position centered on the track, deviations from the same caused by shrinking of the record carrier, or by other reasons, are compensated, and the scanning light spot scans the track in a symmetrical position. Disturbances of the signal provided by the photocell for producing a television picture, for example, due to variations of the track distances, are avoided.

An embodiment of the invention comprises a source of light for producing a beam, preferably a laser; lens means, preferably including a focusing lens and a cylinder lens, for forming an elongated focal spot; means in the beam for varying the intensity of the focal spot along the length thereof so that the intensity increases from one end to the other end of the spot, and preferably including a gray wedge which varies the intensity between the ends of the focal spot in accordance with a substantially constant intensity gradient; a record carrier having a light-permeable recordings disposed along track means, preferably a plurality of tracks, the width of the tracks being less than the length of the focal spot; means for positioning the lens means and the record carrier relative to each other so that the elongated focal spot is located on the record carrier, crosses a track, is substantially centered on the same, and has ends transversely projecting from the same; means for moving the lens means and the record carrier relative to each other so that light from the focal spot passes successively through light permeable recordings of the track means; photocell means disposed for receiving light passing from the focal spot through the light permeable recordings, and producing upon relative transverse displacement between the track means and the focal spot, signals which vary due to the different intensities at the ends of the focal spot; regulating means located in the beam for adjusting in a transverse direction the relative position between the focal spot and the scanned track; and circuit means receiving the varying signals from the photocell and controlling the regulating means in accordance with the varying signals so that the same center the focal spot on the track when a variation of the varying signals indicates an undesirable relative displacement between the focal spot and the scanned track. The circuit means preferably include a resistor-capacitor circuit having a predetermined time constant substantially greater than the scanning time of a recording, and forming a varying output signals of the photocell, an average control signal controlling the regulating means to center the focal spot on the scanned track.

The regulating means preferably include movable deflecting mirrors located in the beam, and piezoceramic members displacing the deflecting mirrors in accordance with the varying output signals of the photocell.

In the preferred embodiment of the invention means are provided for producing a control voltage proportionate to the intensity variations of the source of light. This control voltage is compared with the regulating voltage formed as mean value of the varying output signals of the photocell, and the differential voltage is used for controlling the regulating means by which the scanning spot is centered. Since both controlling voltages are influenced by intensity variations of the source of light, the control of the scanning spot is independent of such intensity variations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figures 1, 2:
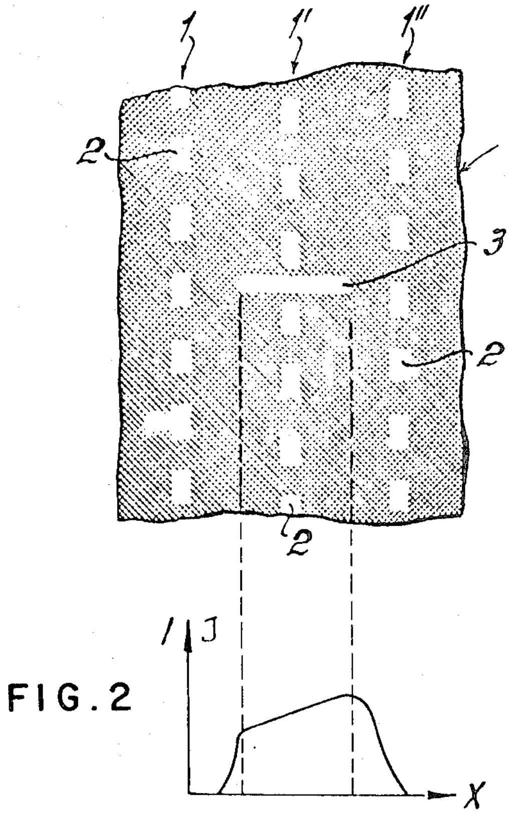
FIG. 1 is a fragmentary view illustrating a portion of an opaque record carrier provided with light permeable recordings forming tracks.
FIG. 2 is a diagram illustrating the varying light intensity of a scanning spot in a direction transverse to the track direction.

FIG. 1 illustrates a small area, for example 30 × 60 microns of an opaque record carrier 6 which has a plurality of tracks 1, 1′, 1″ consisting of light permeable recordings, which may be produced by burning off an opaque layer on a record carrier tape by means of a focused laser beam. The record carrier 6 may be a thin foil consisting of a synthetic material, with a vaporized thin metal coating forming an opaque layer. The information may be recorded in accordance with the frequency modulation system in which the distance of the recordings is varied in accordance with the amplitude of the signal. The edges and ends of the record carrier 6 are not shown in FIG. 1. The tracks may extend in longitudinal or transverse direction of a record carrier tape, depending in which known manner the recordings were made.

In accordance with the invention, the tracks are scanned by a light spot 3 which has a substantially rectangular shape, and is elongated in a direction transverse to the direction of the tracks of the record carrier so that it is unlikely that the scanning spot will miss a line due to relative transverse displacement between the scanning spot and the record carrier. The width of the recordings forming the tracks is about 2 microns, and the spacing of the tracks 8 to 10 microns. Although the scanning of the tracks is made more reliable by the elongated shape of the scanning spot, it may nevertheless occur that the scanning spot assumes a position between the tracks, and between recordings of two tracks in which event either a wrong signal due to simultaneous sensing of two tracks, or no signal at all is produced.

Figure 4:
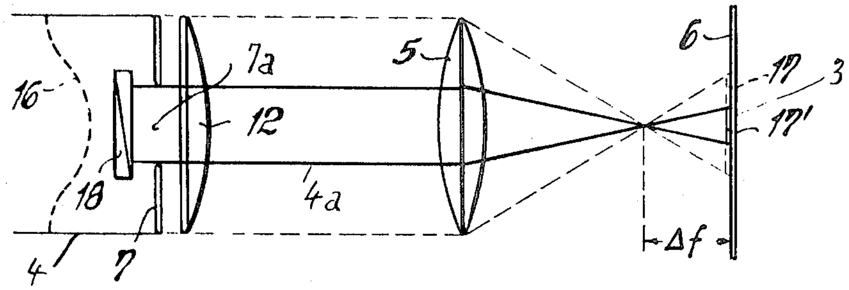
FIG. 4 is a fragmentary schematic view illustrating a detail of the embodiment of FIG. 3 on a larger scale.
Figure 3:
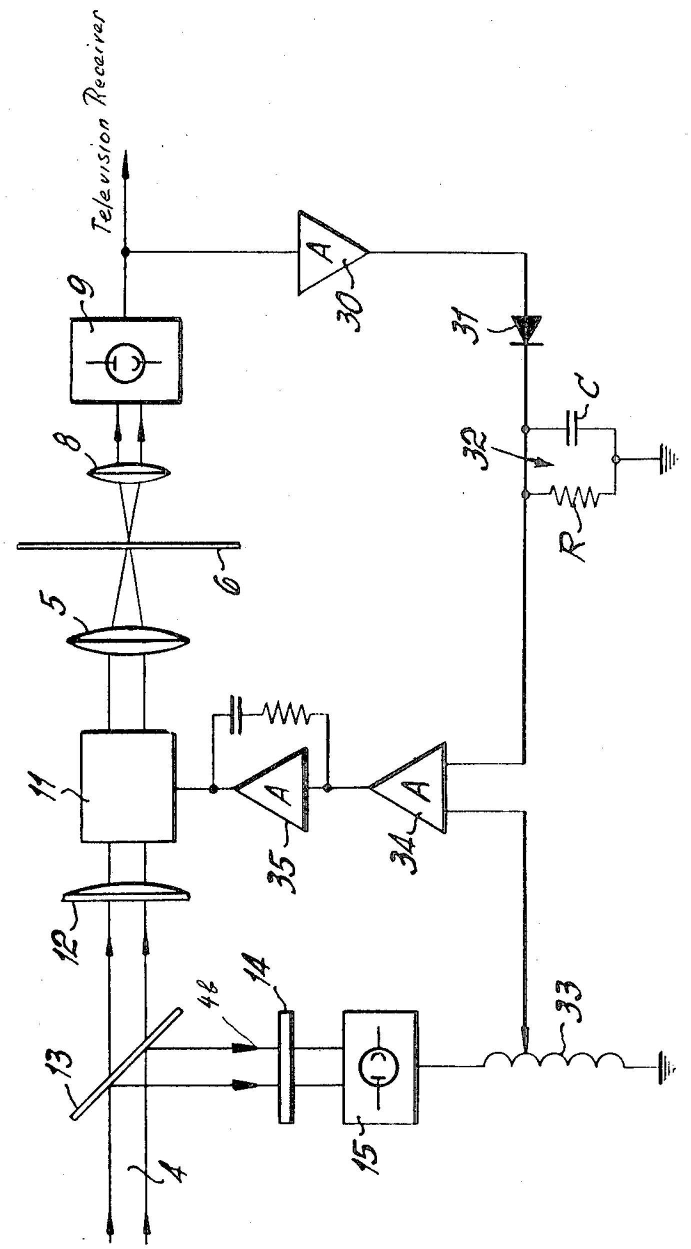
FIG. 3 is a schematic view illustrating an embodiment of the invention, and including a circuit diagram.

In accordance with the invention, this is prevented by the apparatus shown in FIGS. 3 and 4 by which the scanning spot 3 is automatically centered on the respective scanned track.

Referring now to FIGS. 3 and 4, a laser, not shown, produces a beam 4 whose intensity is greater in the axial region than in the outer parts of the beam as is schematically indicated by the graph 16 in FIG. 4. A diaphragm 7 is located in the beam and has a slot-shaped aperture **7*a* whose length corresponds to the diameter of beam 4, while its width, shown in FIG. 4 is less than the diameter of the beam 4′ so that outer parts of the beam are blocked, and a part 4*a* of the beam, having a substantially rectangular cross section, passes through the cylinder lens 12, and through a focusing lens 5. Lenses 12 and 5** are an astigmatic focusing system which produces two focal lines which are perpendicular to each other and spaced a distance $\delta f$.

Record carrier 6 is placed in one of the focal planes in a position in which the focal line on the surface of the record carrier is perpendicular to a track of the same. In order to have very steep flanks of the focal spot in a direction perpendicular to the track, a cylinder lens 12 of such power of refraction is used that the length of the focal line 17 in the plane of the record carrier would be greater than required, and is shortened due to the provision of the slot **7*a* in diaphragm 7 so that the focal spot 3 has a length 17′. In the direction of diaphragm slot 7*a*, the beam 4*a* is not limited so that focusing is not influenced in this direction. The intensity along the length 17′ of focal spot 3 would vary in accordance with the intensity 16 of beam 4*a*, but the diaphragm opening 7*a* is covered by a gray wedge 18 whose gradient is perpendicular to the direction of the diaphragm slot so that the intensity of the focal spot 3 is higher at one end and lower at the other end of the focal spot, and increases in accordance with a constant intensity gradient, as shown by the graph of FIG. 2. FIG. 2 is positioned in relation to FIG. 1 to indicate that the intensity steeply rises and drops to and from the ends of the focal spot 3, and increases in accordance with a linear function along the same. If the focal spot 3 is centered on a track, as shown in FIG. 1, a certain amount of light will pass through each light permeable recording 2. However, if the record carrier 6 is displaced, a portion of the focal spot 3 having higher or lower intensity will scan the respective recordings, and a stronger or lesser signal will reach a photocell 9 through a lens 8. In accordance with the variation of the amount of light entering photocell 9 due to relative transverse displacement between recordings 2 and focal spot 3, different output signals are produced by photocell 9. The varying output signals of the photocell are used for regulating beam 4*a* by means of a regulating device 11 which is disposed between the cylinder lens 12 and the focusing lens 5, as shown in FIG. 3. The output signals of photocell 9 are supplied to a television receiver provided with a decoding demodulator. The regulated signal has a small low frequency amplitude modulation, which does not disturb the signal supplied to the television receiver if the same is frequency modulated. The control of a television receiver by signals obtained from scanned recordings is not an object of the present invention. The varying output signals of the photocell 9 are supplied in accordance with the invention to an amplifier 30, and pass through a diode which rectifies the signals which due to track deviations are amplitude modulated alternating current pulses. The rectified signals are supplied to a resistor capacitor circuit 32 which has a time constant of about $5.10^{-6}$ seconds so that a mean value is formed of a sufficient number of signals. On the other hand, the time constant is short enough to react to rapid displacement of the scanning spot 3 in relation to the track, up to about 10 kHz, without disturbing phase shifting. The mean value of the varying signals can be used as a regulating voltage and directly supplied to the regulating means 11, which will be described with reference to FIG. 5 hereinafter and which includes angularly displaceable mirrors 26 which deflect the beam to center the scanning spot 3 again on the respective track. However, the correction would not be quite accurate if the RC circuit 32** is directly connected with the regulating means 11 since the regulating voltage depends on intensity variations of the laser beam 4.

In accordance with the preferred embodiment of the invention illustrated in FIG. 3, a predominantly transparent mirror 13 projects an auxiliary beam 4*b* transverse to the main beam 4. Beam 4*b* is first attenuated by an absorption filter 14, and then enters an auxiliary photocell 15 connected by a voltage divider 33 to a differential amplifier 34, to which also the regulating mean voltage of the RC circuit 32 is supplied. The control voltage supplied by photocell 15 depends on intensity variations of beam 4, 4*a*, as does the regulating voltage supplied by the RC circuit 32 so that the fluctuations compensate each other, and a differential signal is supplied by differential amplifier 34 to the integrating amplifier 35 only if a difference between the regulating and control voltages indicates a variation of the regulating voltage due to a relative displacement between the scanning spot and the track, and caused by the different intensities of the ends of the focal spot.

The integrating amplifier 35 amplifies the regulating voltage to the voltage required by the regulating means 11. The magnitude and polarity of the voltage must be such that the deviation of the scanning spot 3 from its central position on the respective track is compensated within permissible tolerances.

The regulating means 11 laterally deflects the scanning spot up to ± 50 microns. Assuming a focal length of 16 mm of focusing lens 5, deflection angles of about ± 3.10—$^{3}$ are required. If the deflection is obtained by means of a mirror, mirror angles of ± 1.5 . 10—$^{3}$ are required as a maximum.

While FIG. 3 shows a beam 4 passing through the regulating means 11, actually the beam is shifted or deflected an angle of 90°.

Figure 5:
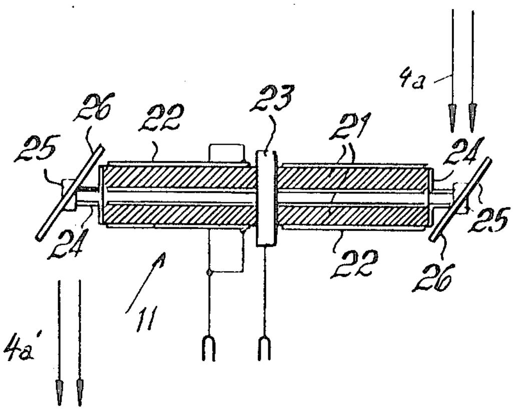
FIG. 5 is a schematic sectional view illustrating a regulating means for holding the scanning spot in a position centered on the scanned track.

A regulating means according to the invention has a pair of deflecting mirrors 26 as shown in FIG. 5 which are angularly displaced by electrical means to obtain not only a staggering of the entering and leaving light, but also a deflection of the light for centering the scanning spot. The electric control means may be electromagnetic or piezoelectric, and an electric control means for the deflecting mirrors 26 having piezoceramic control members is illustrated in FIG. 5. The piezoceramic members 21 have rectangular cross sections and have electrodes 22 vaporized onto the lateral surfaces of the piezoelectric members. The direction of polarization of the ceramic members is selected so that, when a voltage is applied to the two ceramic members, one of the members expands while the other contracts. The piezoceramic members 21 are secured in a frame 23 which also serves as a conductor for the inner electrodes. The thin metal bands 24 are adhesively secured to the end faces of the ceramic members, and have angular end portions supporting plates 25 on which mirrors 26 are secured in a position above the ceramic members 21 so that light is reflected from one mirror to the other. When a voltage is supplied to the electrodes of the piezoceramic members 21, the mirrors are turned small angles so that the beam portion 4*a'* is deflected for centering the focal spot 3 on the respective track.

When the record carrier 6 is moved for instance by transporting rollers in longitudinal direction of the tracks 1,1', 1'', the elongated focal light spot 3 scans the respective track so that light passes through the light permeable recordings to photocells 9 which produces output signals supplied to a television receiver, but also to the RC circuit 32 which forms an average of the signals. If the signals are of constant magnitude, indicating that the scanning focal light spot is centered on the track, the regulating voltage supplied through differential amplifier 34 and amplifier 35 to the regulating means is fully compensated by the control voltage supplied by the auxiliary photocell 15, since both voltages fluctuate only in accordance with intensity fluctuations of the light source. However, if the record carrier 6 moves in transverse direction relative to the scanning focal light spot 3, the scanned light permeable recording 2 is not located at the center of the elongated focal spot 3, but closer to one of its ends where the intensity of the focal spot is either greater, or smaller, depending on the direction of relative displacement. If the intensity of the light of the focal spot passing through the respective recording is increased, an increased output signal is produced by photocell 9 so that the regulating voltage is higher than the control voltage, and a difference between the voltages produces an output voltage at the differential amplifier 34 which is amplified and supplied to the piezoceramic members 21 which cause angular displacement of the deflecting mirrors 26 in such a direction that the focal spot it again centered on the sensed track and no differential regulating voltage is produced at the output of differential amplifier 34 until another deviation takes place.

It will be understood that each of the elements described above, or two or more together, may also find a useful application in other types of regulated scanning apparatus differing from the types described above.

While the invention has been illustrated and described as embodied in a regulating means deflecting an elongated focal scanning spot whose light intensity varies along the length thereof, it is not intended to be limited to the details shown, since various modifications and structural changes may be made without departing in any way from the spirit of the present invention.

What is claimed as new and desired to be protected by Letters Patent is set forth in the appended claims.

I claim:

1. Regulated scanning apparatus comprising, in combination, a source of light for producing a beam, lens means in said beam for forming an elongated vocal spot; means in said beam for varying the intensity of said focal spot along the length thereof so that said intensity increases from one end to the other of said spot; a record carrier having light-permeable recordings disposed along track means, the width of said track means being less than the length of said focal spot; means for positioning said lens means and said record carrier relative to each other so that said elongated focal spot is located on said record carrier, crosses said track means, is substantially centered on the same, and has ends transversely projecting from the same; means for moving said lens means and said record carrier relative to each other so that light from said focal spot passes successively through light permeable recordings of said track means; photocell means disposed for receiving light passing from said focal spot through said light permeable recordings, and producing upon relative transverse displacement between said track means and said focal spot, signals which vary due to the different intensities at said ends of said focal spot; regulating means located in said beam for adjusting in a transverse direction the relative position between said focal spot and said track means; and circuit means receiving said varying signals from said photocell and being connected with said regulating means for controlling the same in accordance with said varying signals so that the same center said focal spot on said track means when a variation of said varying signals indicates an undesirable relative displacement between said focal spot and said track means.

2. Apparatus as claimed in claim 1 wherein said circuit means include means for forming of varying signals occurring within a predetermined time period an average control signal varying when said signals vary, said regulating means being controlled by said average control signal to center said focal spot on said track means.

3. Apparatus as claimed in claim 2 wherein said means for forming an average control signal include a resistor-capacitor circuit having a predetermined time constant substantially greater than the scanning time of a recording; and a diode between said photocell and said resistor-capacitor circuit.

4. Apparatus as claimed in claim 1 wherein said lens means include a cylinder lens and a focusing lens forming an astigmatic focusing system.

5. Apparatus as claimed in claim 1 wherein said means for varying the intensity of said focal spot varies said intensity between said ends of said focal spot in accordance with a substantially constant intensity gradient.

6. Apparatus as claimed in claim 5 wherein said means for varying the intensity includes a gray wedge.

7. Apparatus as claimed in claim 1 comprising a diaphragm located in said beam and having a slot extending across said beam in one direction and being narrow in a direction perpendicular to said one direction, said perpendicular direction being parallel to the longitudinal direction of said focal spot so that the length of said focal spot is reduced and undesired outer portions of said beam do not participate in forming said focal spot.

8. Apparatus as claimed in claim 7 wherein said means for varying the intensity of said focal spot includes a gray wedge covering said slot and constructed to vary the intensity of the portion of the beam passing through said slot so that the intensity of said focal spot increases from one end to the other end of said focal spot in accordance with a substantially constant intensity gradient.

9. Apparatus as claimed in claim 1 wherein said regulating means include movable deflecting mirror means located in said beam, and electrical control means connected with said circuit means for displacing said deflecting mirror means in accordance with said varying signals.

10. Apparatus as claimed in claim 9 wherein said electrical control means include a pair of piezoceramic members having connectors connected with said circuit means for receiving signals from the same, said piezoceramic members being connected with said deflecting mirror means for displacing the same so that said beam is deflected.

11. Apparatus as claimed in claim 9 wherein said lens means include a cylinder lens, and a focusing lends disposed closer to said record carrier than said cylinder lens; and wherein said regulating means is located between said cylinder lens and said focusing lens.

12. Apparatus as claimed in claim 1 comprising means for producing a control voltage proportionate to intensity variations of said source of light; wherein said circuit means forms of said varying signals a regulating voltage also depending on intensity variations of said source of light; a differential amplifier receiving said control voltage and said regulating voltage and producing a differential voltage supplied to said regulating means for controlling the same so that said regulating means is not influenced by variations of said regulating voltage caused by intensity variations of said source of light and responds only to variations of said regulating voltage caused by relative displacement between said focal spot and said track means.

13. Apparatus as claimed in claim 12 wherein said means for producing a control voltage include a partly transparent mirror located in said beam and projecting an auxiliary beam from the same, another photocell receiving said auxiliary beam and producing an output voltage; and a voltage divider between said other photocell and said differential amplifier for receiving said output voltage and for supplying an adjusted control voltage to said differential amplifier.

14. Apparatus as claimed in claim 1 wherein said circuit means include means for forming of varying signals occurring within a predetermined time period an average control signal varying when said signals vary, said regulating means being controlled by said average control signal to center said focal spot on said track means; wherein said lens means include a cylinder lens and a focusing lens forming an astigmatic focusing system; wherein said means for varying the intensity of said focal spot varies said intensity between said ends of said focal spot in accordance with a substantially constant intensity gradient, and includes a gray wedge; comprising a diaphragm located in said beam and having a slot extending across said beam in one direction and being narrow in a direction perpendicular to said one direction, said perpendicular direction being parallel to the longitudinal direction of said focal spot so that the length of said focal spot is reduced and undesired outer portion of said beam do not participate in forming said focal spot, said slot being covered by said gray wedge; and wherein said regulating means include movable deflecting mirror means located in said beam, and electric control means connected with said circuit means for displacing said mirror means in accordance with said varying average control signal.